Nov. 12, 1940.  LA VILLE R. JENNINGS  2,220,959
SCUM REMOVER
Filed April 29, 1939
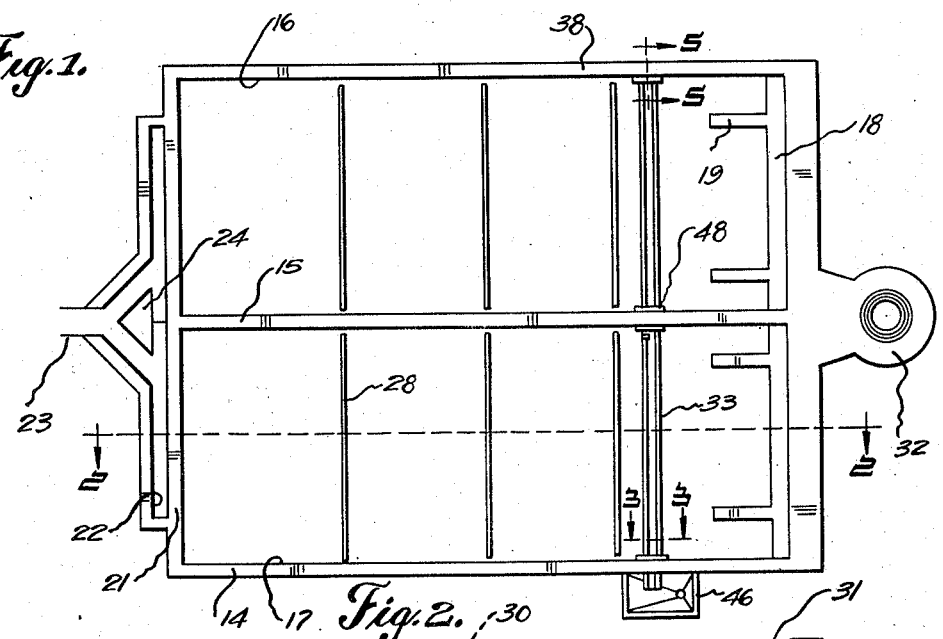
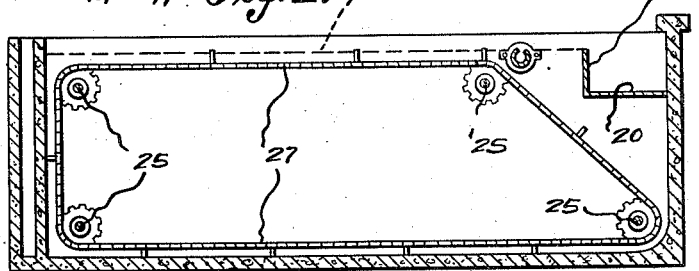
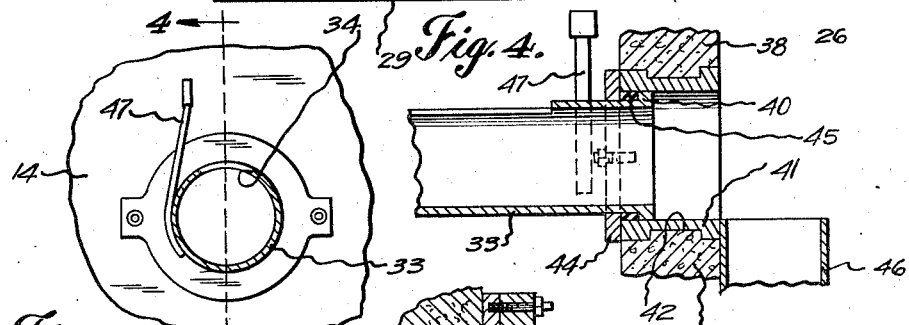
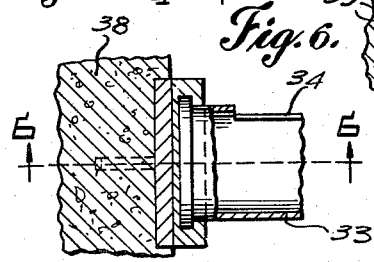
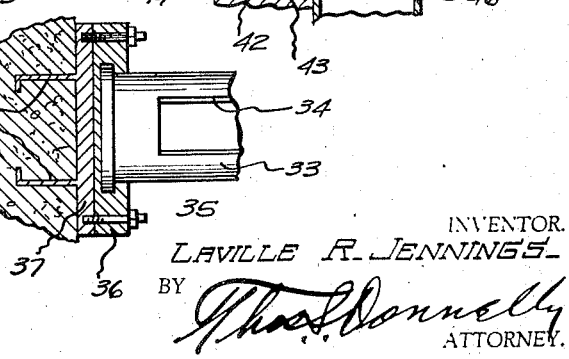
INVENTOR.
LAVILLE R. JENNINGS
BY
ATTORNEY.

Patented Nov. 12, 1940

2,220,959

UNITED STATES PATENT OFFICE 2,220,959

SCUM REMOVER

La Ville R. Jennings, Owasso, Mich.

Application April 29, 1939, Serial No. 270,787

2 Claims. (Cl. 210—55)

My invention relates to a new and useful improvement in a scum remover adapted for use, particularly in sewage disposal plants, in which a settling basin is used, into which the sewage is delivered for sedimentation. In such plans of sewage disposal, the sludge, which settles to the bottom of the settling tank, is carried or scraped toward one end of the settling tank at which it passes into a trough, conduit, or the like, for the removal of the same from the settling tank. A common method of carrying the sludge to one end of the tank is by means of an endless conveyor having a belt or set of chains projecting outwardly from which is a number of spaced scraper blades. Experience has shown that in the use of such sedimentation tanks, a scum commonly forms on top of the liquid contained therein, the presence of which is very objectionable for many reasons. It is an object of the present invention to provide means whereby the scum forming on the top of the liquid may be easily and quickly removed, either through a constant removal of the same as it forms, or by periodic removal of it.

Another object of the invention is the provision of a scum receiving conduit adapted for being easily and quickly moved into position for entrapping the scum and conducting the same away and easily and quickly moved to inoperative position.

Another object of the invention is the provision of a device of this class which will be simple in structure, economical of manufacture, durable, compact easily and quickly installed, easily operated, and possessed of a maximum efficiency.

Other objects will appear hereinafter.

The specification, for the purposes of clarity and ease in understanding the invention, is accompanied by a drawing in which, Fig. 1 is a top plan view of a sediment tank showing the invention applied, Fig. 2 is a sectional view taken on line 2—2 of Fig. 1, Fig. 3 is a fragmentary sectional view taken on line 3—3 of Fig. 1 slightly enlarged, Fig. 4 is a fragmentary sectional view taken on line 4—4 of Fig. 3, Fig. 5 is a fragmentary sectional view slightly enlarged taken on line 5—5 of Fig. 1, Fig. 6 is a view taken on line 6—6 of Fig. 5.

In the drawing I have illustrated the invention applied to a sedimentation tank 14 divided by the central wall or partition 15 into a pair of compartments or chambers 16 and 17. Projecting inwardly from the end wall 18 is a plurality of spaced weir plates 19 at the location of an effluent channel 20.

Formed on the end wall 21 is a channel 22 communicating with an inlet pipe 23 through which the influent is delivered, a baffle 24 being positioned in front of the outlet end of the pipe 23.

Extending transversely of this tank are shafts 25 carrying the sprocket gears 26 which mesh with endless sprocket chains 27. A plurality of gears 26 is mounted on each of the shafts and a plurality of sprocket chains 27 is provided, the sprocket chains being connected by scraper blades 28 which project outwardly therefrom. The shafts 25 are so located that with the sprocket chains traveling in a clock-wise direction in Fig. 2, the blades 28 will ride along the upper surface of the bottom 29 of the tank and serve to wipe it clean from sludge carrying the sludge toward the wall 21 at which the outlet conduit would be located. As shown in Fig. 2, the upper shafts 25 are so located and the width of the blades 28 are so arranged that in the return movement, the upper edge of the blade projects slightly above the water level in the tank which is indicated by the dotted line 30, this level being determined by the height of the wall 31 of the effluent channel 20 which communicates with the effluent chamber 32.

The invention comprises a conduit which I have shown constructed in a form of a tube 33 having a longitudinally extending slot 34 formed therein. From the description given, it will be obvious that this member 33 need not be a tube but may consist of a trough or other similar structure capable of functioning in the manner intended.

The tube is closed at one end and provided with a flange 35 secured by a retainer 36 which is bolted or otherwise secured to a metallic plate 37 embedded in the wall 38 of the tank which is generally made of concrete, the securing prongs 39 projecting outwardly from the plate 37 serving as anchorage in the wall 38.

The opposite end of the tube is provided with a flange 40 and extended into the bushing 41 secured in an opening 42 formed in the wall 43. A jam ring 44 is bolted to the bushing 41 and serves to press the packing 45 against the flange 40 to provide a leak proof connection. Mounted on the wall 43 below the bushing 41 is a scum pit 46 into which the scum passes.

Attached to the tube 33 is a handle 47 whereby the tube 33 may be rocked on its mountings and on the bearing 48 mounted in the partition 15 and through which the tube 33 projects. The tube 33 is mounted with its axis beneath the water level 30 a distance less than the radius of the tube so that when the tube is rocked so that the slot 34 is at the top, no scum floating on the top of the water level 30, will enter the tube. When desired, by means of the handle 37, the tube 33 may be rocked to bring the slot 34 downwardly below the level of the water to permit the scum to flow into the slot and thus pass into the scum pit 46 from which it is conducted to a suitable deposit. The tube may be rocked to a position for catching the scum and left in this position to conduct the scum away as it accumulates. This would, however, result in conducting a certain amount of liquid out of the tank which in some cases would be undesirable and it is preferable that the tube normally be rocked to a position with its slot on top and then after the scum has accumulated to a certain amount, rocked to bring the slot below the level of the scum to permit its passage into the tube.

It is believed obvious that other mountings of the tube may be resorted to so that it may be raised and lowered to inoperative and operative position and it is the purpose to embrace such variations and modifications within the scope of the appended claims.

It is also believed that, while I have shown the invention applied to a rectangular tank, it may be used with other shaped tanks such as circular and etc.

What I claim as new is:

1. In combination with a settling tank having oppositely disposed side walls and oppositely disposed end walls and adapted for the reception of liquid at one end and the discharge of the same from the other end, a supporting plate; securing prongs projecting outwardly from one face of said supporting plate and projecting inwardly from the inner face of a side wall for securing said supporting plate on said side walls; a retainer mounted on said supporting plate, the opposite side wall having an opening formed in alignment with said retainer; a bushing secured in said opening; a scum removing tube having an elongated slot formed therein, one end of said tube rotatably engaging in said bushing and the other end of said tube rotatably engaging and supported by said retainer; and means attached to said tube for rotating the same on its axis.

2. In combination with a settling tank of the class described having oppositely disposed end walls and oppositely disposed side walls and adapted for the reception of liquid at one end and the discharge of the same from the other end, a supporting plate secured to the inner face of one of said side walls adjacent one end thereof at a height adjacent the normal liquid level, the opposite side wall having an opening formed therein in alignment with said plate; a bushing in said opening; a scum removing tube having an elongated slot formed in one side and rotatably mounted at one end in said bushing, said end of said tube being open and said bushing extending through said side wall; a retainer mounted on said supporting plate for rotatably supporting the opposite end of said tube, the opposite end being closed, said retainer and said bushing supporting said tube with its axis below the upper surface of scum floating on liquid at the normal liquid level; and means for rocking said tube for moving said slot into position below the scum level.

LA VILLE R. JENNINGS.